(12) United States Patent
Doyle (10) Patent No.: US 8,715,843 B2
(45) Date of Patent: May 6, 2014

(54) VENT CAP INCLUDING WATERING VALVE, FLOAT AND FLUID FLOW PATH THAT DOES NOT IMPINGE FLOAT

(75) Inventor: Michael A. Doyle, Holland, OH (US)

(73) Assignee: Doyle Manufacturing, Inc., Holland, OH (US)

( * ) Notice: Subject to any disclaimer, the term of this patent is extended or adjusted under 35 U.S.C. 154(b) by 397 days.

(21) Appl. No.: 13/028,326

(22) Filed: Feb. 16, 2011

(65) Prior Publication Data

US 2011/0200851 A1 Aug. 18, 2011

Related U.S. Application Data

(60) Provisional application No. 61/305,321, filed on Feb. 17, 2010.

(51) Int. Cl.
*H01M 2/12* (2006.01)
*H01M 2/36* (2006.01)

(52) U.S. Cl.
USPC ............... 429/79; 429/72; 429/74; 429/76; 429/77; 429/82

(58) Field of Classification Search
USPC .............. 429/50, 72, 74, 76, 77, 79, 82
See application file for complete search history.

(56) References Cited

U.S. PATENT DOCUMENTS

| 4,696,874 | A | | 9/1987 | Tadiello |
| 5,048,557 | A | | 9/1991 | Campau |
| 5,090,442 | A | | 2/1992 | Campau |
| 5,527,593 | A | | 6/1996 | Afzali-Ardakani et al. |
| 5,803,138 | A | * | 9/1998 | Oschmann et al. ........... 141/198 |
| 5,832,946 | A | | 11/1998 | Campau |
| 5,862,830 | A | | 1/1999 | Landau |
| 5,902,694 | A | | 5/1999 | Landau |
| 6,227,229 | B1 | * | 5/2001 | Campau ........................ 137/260 |
| 6,228,525 | B1 | | 5/2001 | Hassell |
| 6,376,119 | B1 | | 4/2002 | Nann et al. |
| 6,677,075 | B2 | | 1/2004 | Cramer |
| 7,556,056 | B2 | | 7/2009 | Hutchinson |
| 2004/0013936 | A1 | | 1/2004 | Barrett, Jr |
| 2005/0221166 | A1 | | 10/2005 | Jones et al. |
| 2006/0269832 | A1 | * | 11/2006 | Hutchinson ..................... 429/74 |

* cited by examiner

*Primary Examiner* — Sean P Cullen
(74) *Attorney, Agent, or Firm* — Fraser Clemens Martin & Miller LLC; J. Douglas Miller (57) ABSTRACT

A vent cap includes a main body configured to be received within an opening in a cover of a battery cell, the main body including a fluid flow path formed therethrough to facilitate a flow of a fluid to be added to the battery cell, a valve moveably disposed within the flow path to selectively open and close the fluid flow path, and a float coupled to the valve and positioned to float adjacent a surface of a fluid disposed within the battery cell, the float causing the valve to open the fluid flow path at a pre-determined fluid level within the battery cell to permit the fluid to be added to the battery cell to flow through the fluid flow path, wherein the fluid flow path is configured to minimize an impinging on the float by the fluid to be added to the battery cell.

17 Claims, 12 Drawing Sheets

VENT CAP INCLUDING WATERING VALVE, FLOAT AND FLUID FLOW PATH THAT DOES NOT IMPINGE FLOAT

CROSS REFERENCE TO RELATED APPLICATIONS

This application is entitled to claim the benefit of, and claims priority to, U.S. provisional patent application Ser. No. 61/305,321 filed Feb. 17, 2010, the entire disclosure of which is incorporated herein by reference.

FIELD OF THE INVENTION

The invention relates to a vent cap and more particularly to a vent cap for a battery cell including a fluid fill path and an associated valve which permits the addition of fluid to the battery cell when a fluid level within the battery cell is below a desired level.

BACKGROUND OF THE INVENTION

Wet cell electric storage batteries such as those used in industrial traction batteries typically include a battery cover having an opening providing communication with a battery cell. The opening facilitates access to the battery cell for initial filling with electrolyte and permitting the fluid level to be checked and corrected occasionally during the life of the battery. A vent cap is typically provided that is removeably received in the opening. The vent cap permits the controlled venting of gases generated during the discharging and the recharging of the battery.

Prior art battery vent caps such as those illustrated in U.S. Pat. Nos. 7,556,056, 6,228,525, and 4,696,874 have included a fluid fill path formed therein which permits the addition of fluid to the battery cell without removing the vent cap from the opening. These prior art vent caps also include a float mechanism associated with a valve, wherein the float mechanism and the valve cooperate to open and close the fluid fill path at predetermined fluid levels within the battery cell. An inherent problem with the float mechanism and the valve in the prior art vent caps is the valve restricts the flow of water through the fluid fill path which increases a time required to fill the battery cell. Another inherent problem with the float mechanism and the valve in the prior art vent caps is fluid is discharged from the fluid fill path onto the float mechanism which can result in a malfunction of the float mechanism causing an undesired opening and closing of the fluid fill path by the valve.

It would be desirable to produce a vent cap for a battery cell having a float mechanism and an associated valve adapted to open and close a fluid fill path within the vent cap which minimizes a time required to fill the battery cell with a fluid and militates against an undesired opening and closing of the fluid fill path by the valve.

SUMMARY OF THE INVENTION

Concordant and consistent with the present invention, a vent cap for a battery cell having a float mechanism and an associated valve adapted to open and close a fluid fill path within the vent cap which minimizes a time required to fill the battery cell with a fluid and militates against an undesired opening and closing of the fluid fill path by the valve, has surprisingly been discovered.

In one embodiment, a vent cap comprises: a main body configured to be received within an opening in a cover of a battery cell, the main body including a fluid flow path formed therethrough to facilitate a flow of a fluid to be added to the battery cell; a valve moveably disposed within the flow path to selectively open and close the fluid flow path; and a float coupled to the valve and positioned to float adjacent a surface of a fluid disposed within the battery cell, the float causing the valve to open the fluid flow path at a pre-determined fluid level within the battery cell to permit the fluid to be added to the battery cell to flow through the fluid flow path, wherein the fluid flow path is configured to minimize an impinging on the float by the fluid to be added to the battery cell.

In another embodiment, a vent cap comprises: a main body received within an opening in a cover of a battery cell, the main body including a fluid flow path formed therethrough to facilitate a flow of a fluid to be added to the battery cell; a valve having a valve stem and a valve disk extending radially outwardly from the valve stem, the valve disk disposed within the flow path to selectively open and close the fluid flow path; and a float coupled to the valve stem and positioned to float adjacent a surface of a fluid disposed within the battery cell, the float causing the valve to open the fluid flow path at a pre-determined fluid level within the battery cell to permit the fluid to be added to the battery cell to flow through the fluid flow path, wherein the fluid flow path is isolated from the float to minimize an impinging on the float by the fluid to be added to the battery cell.

The present invention also includes methods of filling a battery cell with a fluid.

One method comprises the steps of: providing a vent cap including: a main body having a fluid flow path formed therethrough; a valve moveably disposed within the flow path to selectively open and close the fluid flow path; and a float coupled to the valve and positioned to float adjacent a surface of a fluid disposed within the battery cell, the float causing the valve to open the fluid flow path at a pre-determined level of the fluid disposed within the battery cell; directing a fluid through the fluid flow path and into the battery cell, wherein the fluid flow path is configured to minimize an impinging on the float by the fluid directed through the fluid flow path; and elevating the fluid level within the battery cell to cause the float to move, thereby causing the valve to close the fluid flow path.

BRIEF DESCRIPTION OF THE DRAWINGS

The above advantages of the invention will become readily apparent to those skilled in the art from reading the following detailed description of an embodiment of the invention in the light of the accompanying drawings, in which.

DETAILED DESCRIPTION OF THE PREFERRED EMBODIMENT OF THE INVENTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 7:
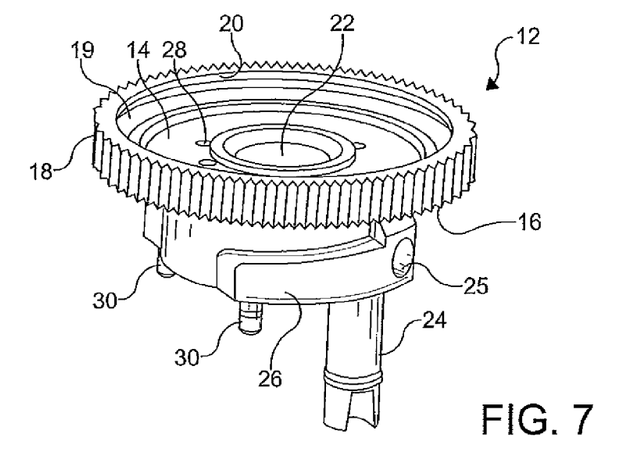
FIG. 7 is a perspective view of a base member of the vent cap illustrated in FIG. 1.

Referring now to the drawings, there is shown a vent cap 10 for selectively covering an opening in a battery cover 11A of an associated battery cell 11. The vent cap 10 includes a base member 12, a condenser housing 32, a cage 60, a cage' end cap 106, and a hollow float guard 138, together forming a main body. As shown in FIG. 7, the base member 12 includes an upper surface 14 and a lower surface 16. A wall 18 extends upwardly from a peripheral edge of the base member 12. A detent 20 is formed on an inner surface of the wall 18. An annular groove 19 is formed in the upper surface 14 adjacent the wall 18 adapted to receive an O-ring 21. A first cavity 22 is formed in a central portion of the upper surface 14 of the base member 12. A fluid conduit 24 depends from the lower surface 16 of the base member 12. A passageway 25 is formed in the base member 12 providing fluid communication between the first cavity 22 and the fluid conduit 24. A plug (not shown) is typically removably received within the passageway 25 adjacent an exterior surface of the base member 12 to substantially block a flow of fluid through passageway 25 to an exterior of the vent cap 10. An attachment member 26 depends from the lower surface 16 of the base member 12, wherein the attachment member 26 surrounds and is spaced apart from a wall forming the first cavity 22. The attachment member 26 facilitates removeably coupling the vent cap 10 to the associated battery cover 11A. In the illustrated embodiment, the attachment member 26 is a quarter-turn bayonet style attachment member. It should be understood that other types of attachment members can be used such as a threaded section or a plug type employing a frictional engagement to removeably couple the vent cap 10 the associated battery cover 11A. A plurality of apertures 28 is formed in the base member 12 between the first cavity 22 and the wall forming the attachment member 26 providing fluid communication between the upper surface 14 and the lower surface 16 of the base member 12. A plurality of coupling members 30 depends from the attachment member 26.

Figure 8A:
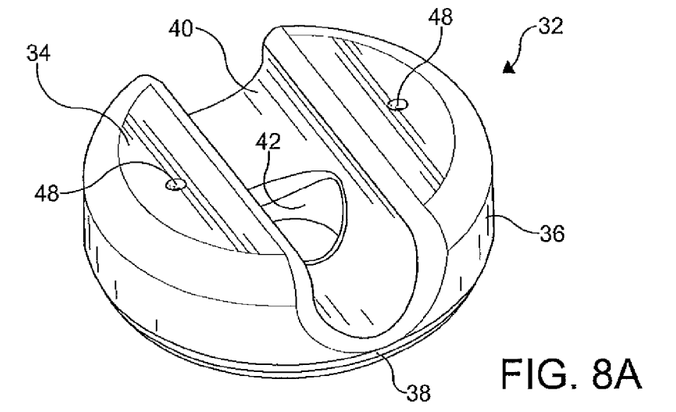
FIG. 8A is a top perspective of a condenser housing of the vent cap illustrated in FIG. 1.
Figure 8B:
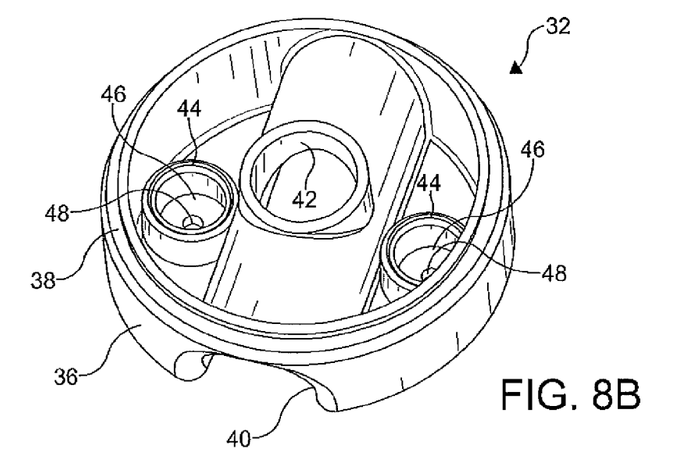
FIG. 8B is a bottom perspective of the condenser housing of FIG. 8A.

As shown in FIGS. 8A-8B, the condenser housing 32 includes a top panel 34 and a sidewall 36 depending therefrom defining a hollow interior of the condenser housing 32. A detent 38 is formed adjacent a base end of the sidewall 36 adapted to cooperate with the detent 20 and the O-ring 21 of the base member 12 to couple the condenser housing 32 to the base member 12 and form a substantially fluid tight seal therebetween. A generally U-shaped channel 40 is formed in the top panel 34 that extends from one side to an opposite side of the condenser housing 32. An opening 42 is formed in a central portion of the top panel 34 at a bottom of the U-shaped channel 40. A pair of retention members 44 depends from an interior surface of the condenser housing 32. Each of the retention members 44 forms a second cavity 46 adapted to receive a flame arrester (not shown). Apertures 48 are formed in the top panel 34 to provide fluid communication between the second cavity 46 and an atmosphere surrounding an exterior of the condenser housing 32. It should be understood that a fluid condensing medium such as spherical beads, for example, can be disposed in the interior of the condenser housing 32 to condense electrolyte from gases being vented from the battery to the atmosphere surrounding the exterior of the condenser housing 32.

Figure 1:
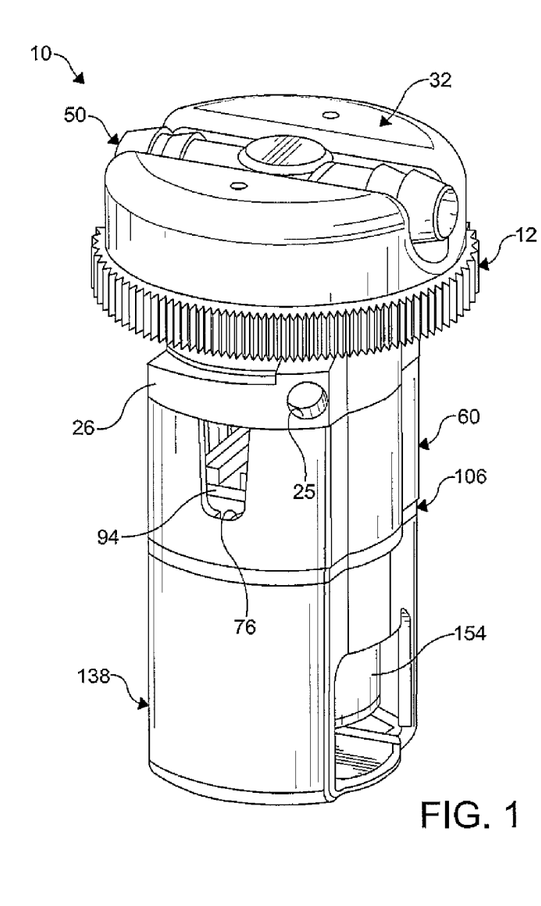
FIG. 1 is a perspective view of a vent cap according to an embodiment of the invention.
Figure 2:
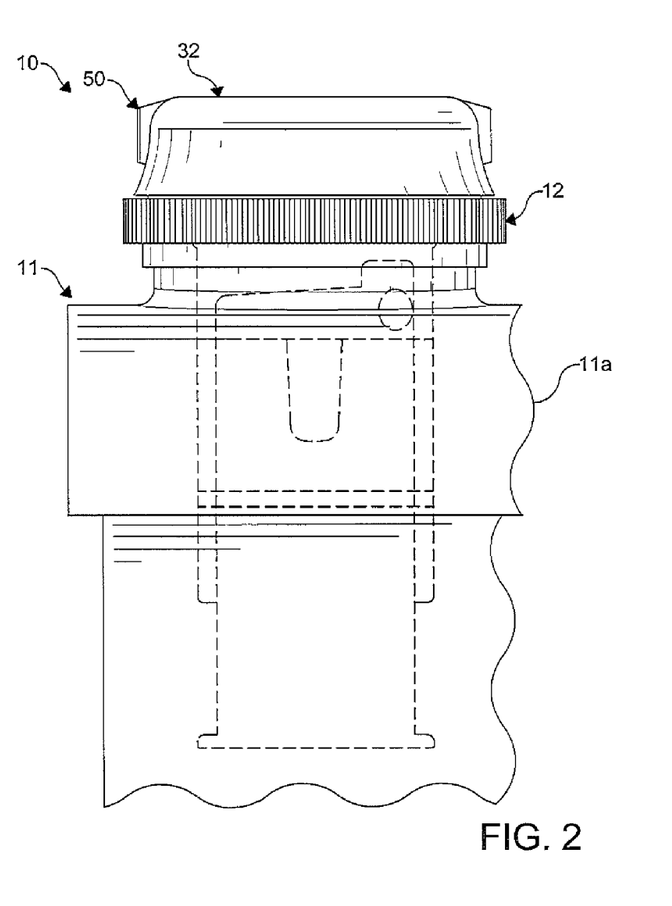
FIG. 2 is a fragmentary front-elevational view of the vent cap illustrated in FIG. 1 showing the vent cap disposed in an opening of a battery cover of a batter cell.
Figure 3:
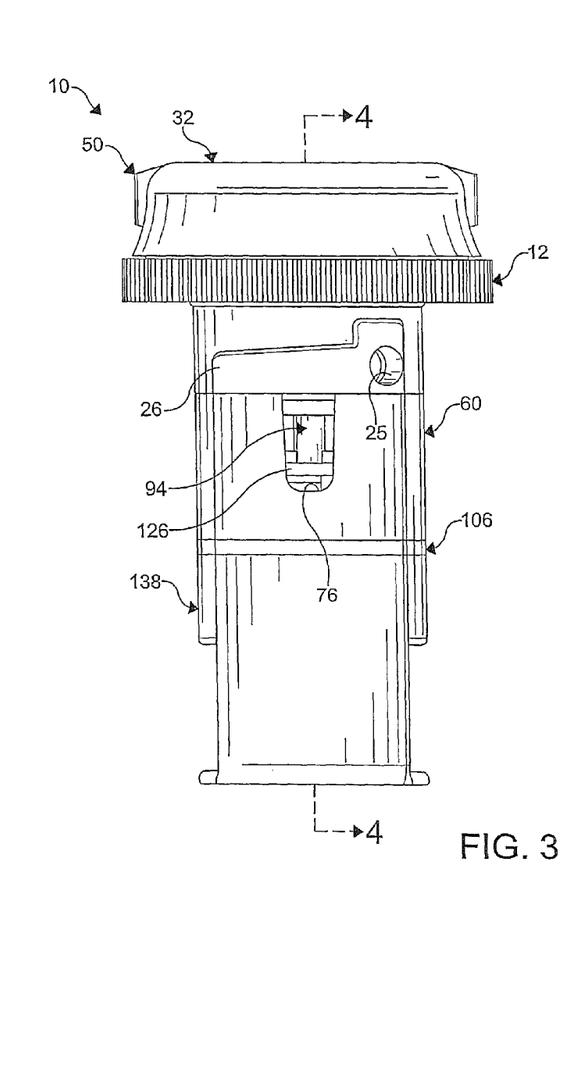
FIG. 3 is a front-elevational view of the vent cap illustrated in FIG. 1.
Figure 4:
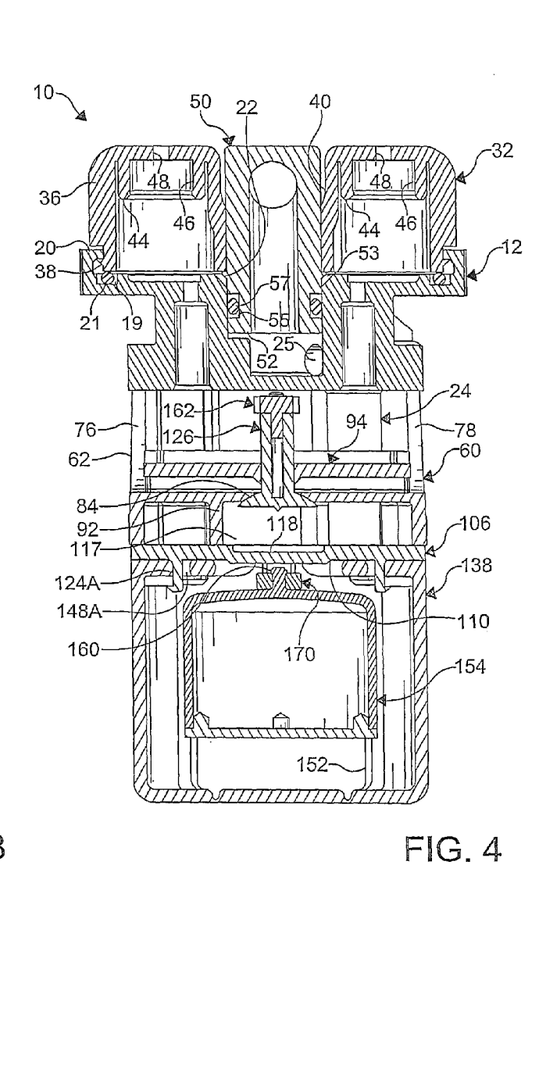
FIG. 4 is a cross-sectional side-elevational view of the vent cap taken along line 4-4 shown in FIG. 3.
Figure 5:
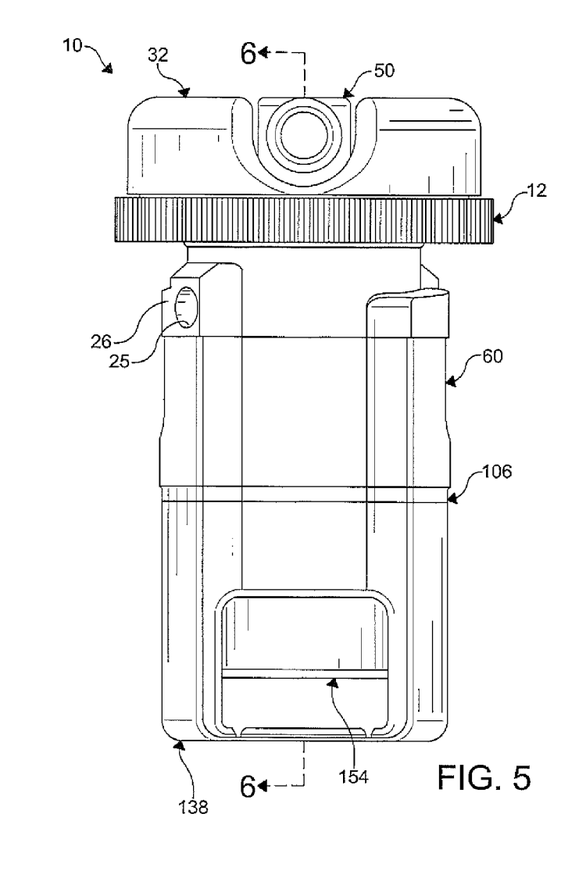
FIG. 5 is a side-elevational view of the vent cap illustrated in FIG. 1.
Figure 6:
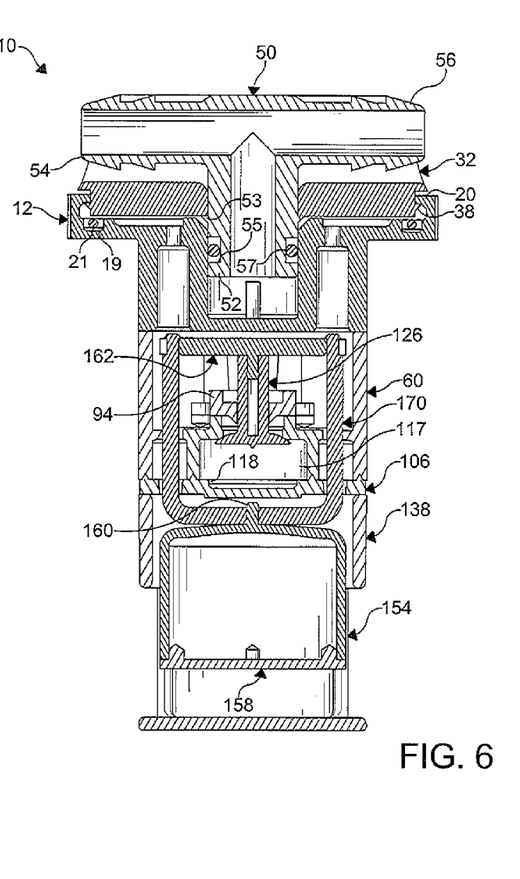
FIG. 6 is a cross-sectional front-elevational view of the vent cap taken along line 6-6 shown in FIG. 5.
Figure 9:
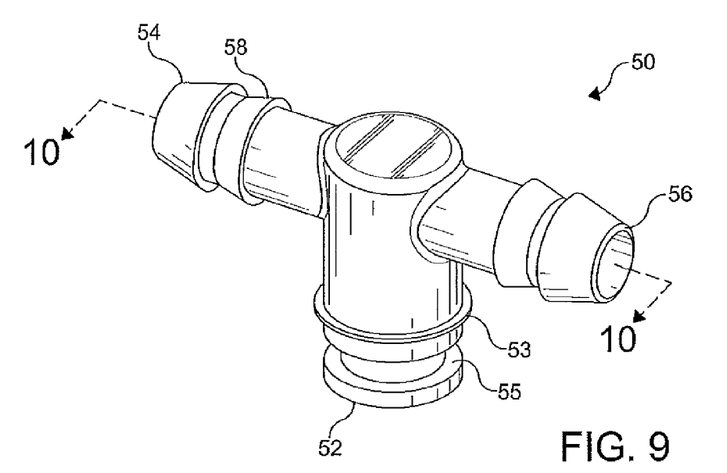
FIG. 9 is a perspective view of a T-fitting of the vent cap illustrated in FIG. 1.
Figure 10:
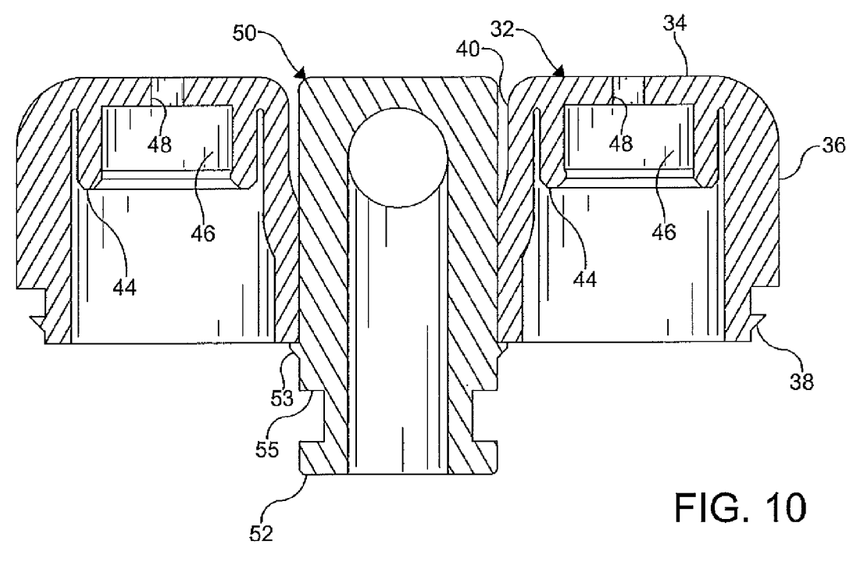
FIG. 10 is a cross-sectional side-elevational view of the condenser housing having the T-fitting disposed therein and taken along line 10-10 shown in FIG. 9.

A T-fitting 50, as shown in FIGS. 9-10, is provided having a base end 52 and opposing lateral ends 54, 56. The T-fitting 50 is hollow to provide a fluid flow path therethrough. An annular protuberance 53 is formed on and circumscribes the base end 52. An annular groove 55 is formed in the base end 52 and receives an O-ring 57 therein as shown in FIGS. 4 and 6. The base end 52 is adapted to be received in the opening 42 formed in the top panel 34 of the condenser housing 32 and extend into the first cavity 22 formed in the base member 12 of the vent cap 10. The protuberance 53 and the O-ring 57 cooperate with the opening 42 and a wall forming the first cavity 22, to couple the T-fitting 50 to the condenser housing 32 and form a substantially fluid tight seal between the T-fitting 50 and the base member 12. The lateral ends 54, 56 of the T-fitting 50 are received within the U-shaped channel 40 when the base end 52 is received in the opening 42 formed in the top panel 34 of the condenser housing 32. The lateral ends 54, 56 of the T-fitting 50 include at least one rib 58 formed thereon to facilitate coupling a tube (not shown) thereto. In the illustrated embodiment, the lateral ends 54, 56 are substantially circular in cross-section to receive tubing thereon. It should be understood that the lateral ends 54, 56 can have other shapes such as a substantially square cross-sectional shape to receive square tubing, for example.

Figure 11A:
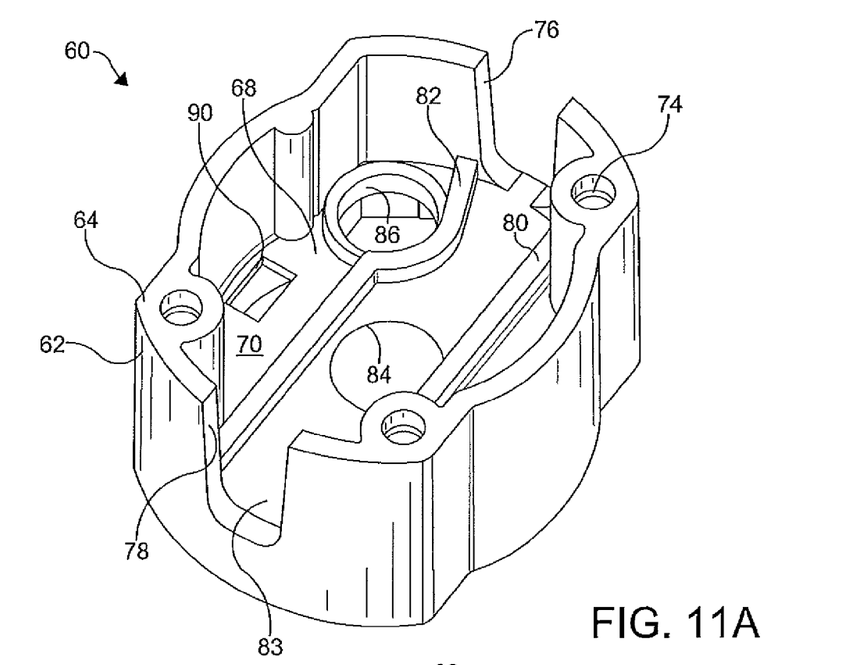
FIG. 11A is a top perspective view of a cage of the vent cap illustrated in FIG. 1.
Figure 11B:
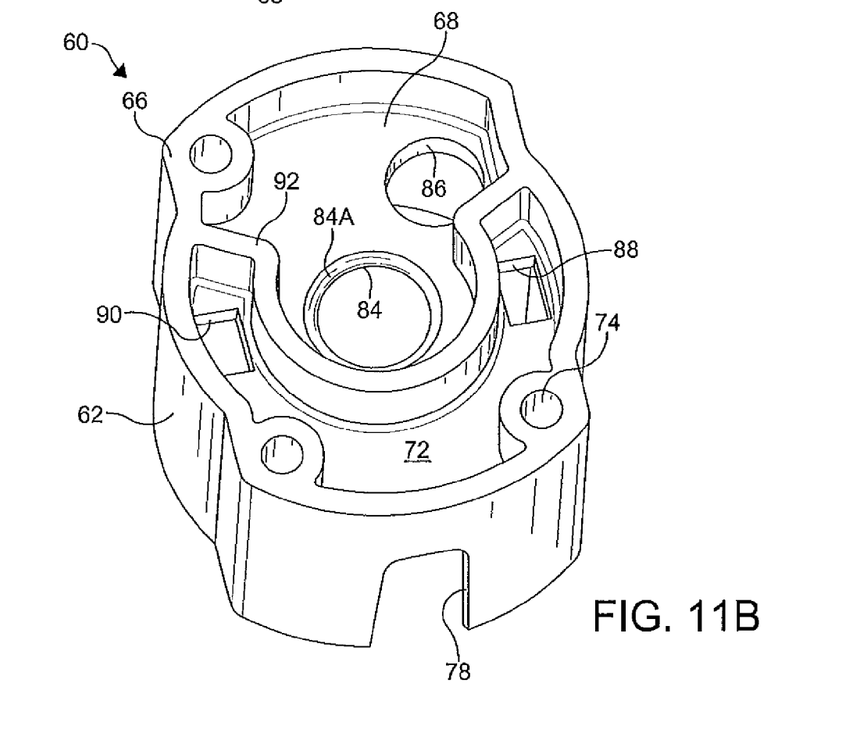
FIG. 11B is a bottom perspective view of the cage of FIG. 11A.

Shown in FIGS. 11A-11B, the cage 60 includes a sidewall 62 having an upper end 64 and a lower end 66. A floor panel 68 having an upper surface 70 and a lower surface 72 is formed integrally with the sidewall 62 adjacent the lower end 66 thereof. Openings 74 are formed in the sidewall 62 that extend from the upper end 64 to the lower end 66 thereof, wherein the openings 74 at the upper end 64 are adapted to receive the coupling members 30 depending from the attachment member 26 of the base member 12 to couple the cage 60 to the base member 12. A pair of opposing slots 76, 78 is formed in the sidewall 62 that extend from the upper end 64 of the sidewall 62 to the upper surface 70 of the floor panel 68. A pair of spaced apart wall members 80, 82 is formed on the upper surface 70 of the floor panel 68. The wall members 80, 82 extend between the sidewall 62 from adjacent the slot 76 to adjacent the slot 78 to define a flow channel 83. A first valve opening 84 is formed in the central portion of the floor panel 68 between the wall members 80, 82. As a non-limiting example, a tapered edge 84A defines a periphery of the first valve opening 84. conduit opening 86 is formed in the floor panel 68 adapted to receive the fluid conduit 24 depending from the lower surface 16 of the base member 12. A pair of spaced apart substantially rectangular openings 88, 90 is formed in the floor panel adjacent the sidewall 62. The lower surface 72 of the floor panel 68 includes a wall member 92 depending therefrom that extends between the sidewall 62 and cooperates therewith to divide the lower surface 72 into a first section including the first valve opening 84 and the conduit opening 86 and a second section including the openings 88, 90.

Figure 12A:
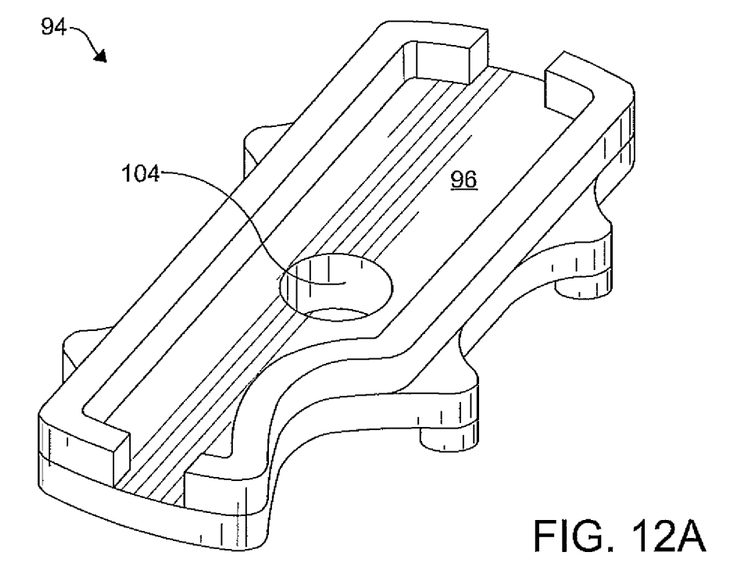
FIG. 12A is a top perspective view of a splash guard adapted to be coupled to an upper end of the cage.
Figure 12B:
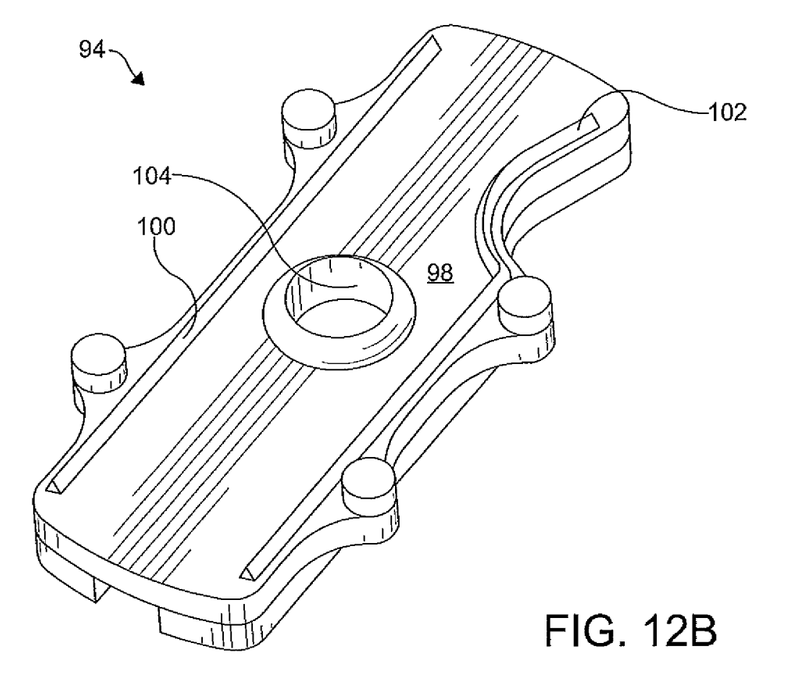
FIG. 12B is a bottom perspective view of the splash guard of FIG. 12A.

An elongate splash guard 94, shown in FIGS. 12A-12B, having an upper surface 96 and a lower surface 98 is disposed in the cage 60. The splash guard 94 extends between the sidewall 62 from adjacent the slot 76 to adjacent the slot 78. A pair of elongate protuberances 100, 102 is formed on the lower surface 98 of the splash guard 94 that abut the wall members 80, 82 of the cage 60 adapted to facilitate coupling the splash guard 94 to the wall members 80, 82 employing sonic welding or the like. A second valve opening 104 is formed in the splash guard 94.

Figure 13A:
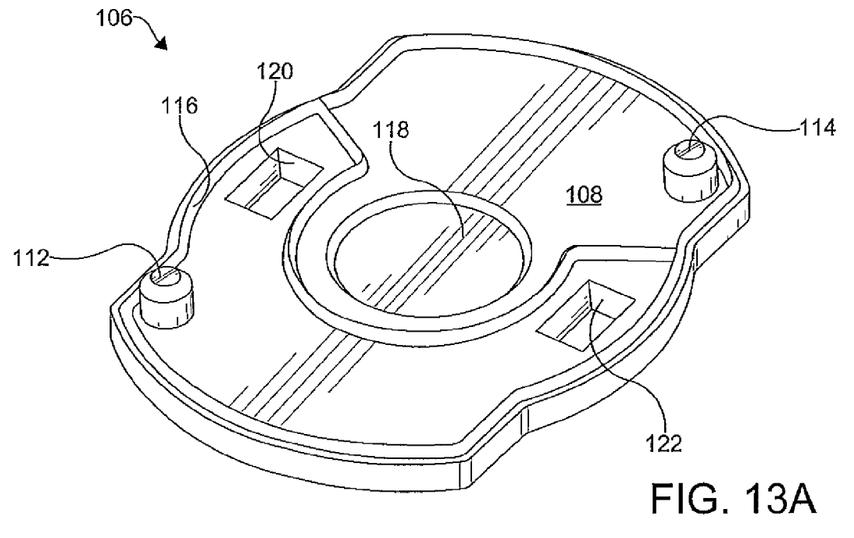
FIG. 13A is a top perspective view of a cage end cap adapted to be coupled to a bottom end of the cage.
Figure 13B:
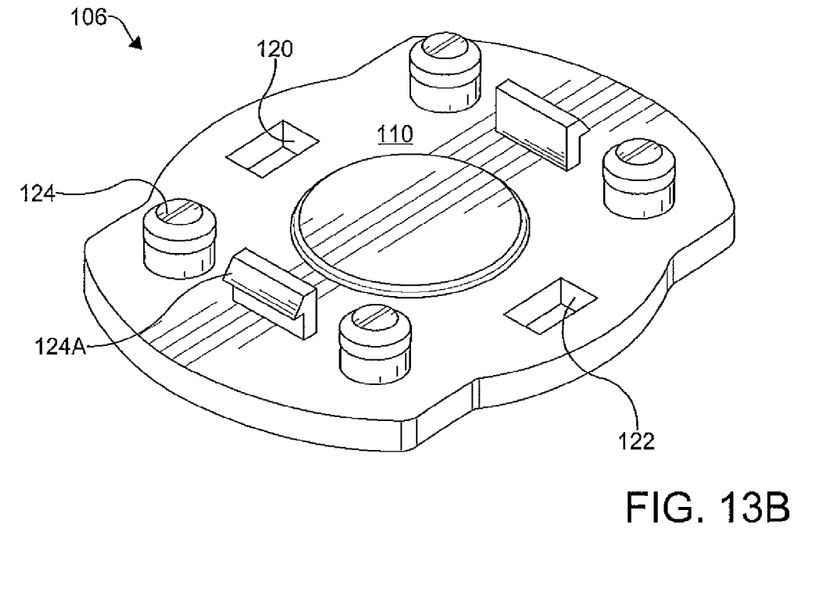
FIG. 13B is a bottom perspective view of the cage end cap of FIG. 13A.

As shown in FIGS. 13A-13B, the cage end cap 106 includes an upper surface 108 and a lower surface 110. A pair of coupling members 112, 114 is formed on the upper surface 108 of the cage end cap 106 adapted to be received in the openings 74 at the lower end 66 of the sidewall 62 of the cage 60 to facilitate coupling the cage end cap 106 to the cage 60. A protuberance 116 is formed on the upper surface 108 of cage end cap 106 adapted to abut the lower end 66 of the sidewall 62 and the wall member 92 to facilitate coupling the cage end cap 106 to the cage 60 employing sonic welding or the like, for example. The cage end cap 106, sidewall 62, and wall member 92 define a fluid chamber 117 shown in FIGS. 4 and 6. A valve seat 118 is formed in the upper surface 108 of the cage end cap 106. A pair of spaced apart substantially rectangular openings 120, 122 is formed in the cage end cap 106. A plurality of coupling members 124 depends from the lower surface 110 of the cage end cap 106. As a non-limiting example, a pair of snap coupling members 124A are formed on and extend from the lower surface 110 of the cage end cap 106.

Figures 14A, 14B:
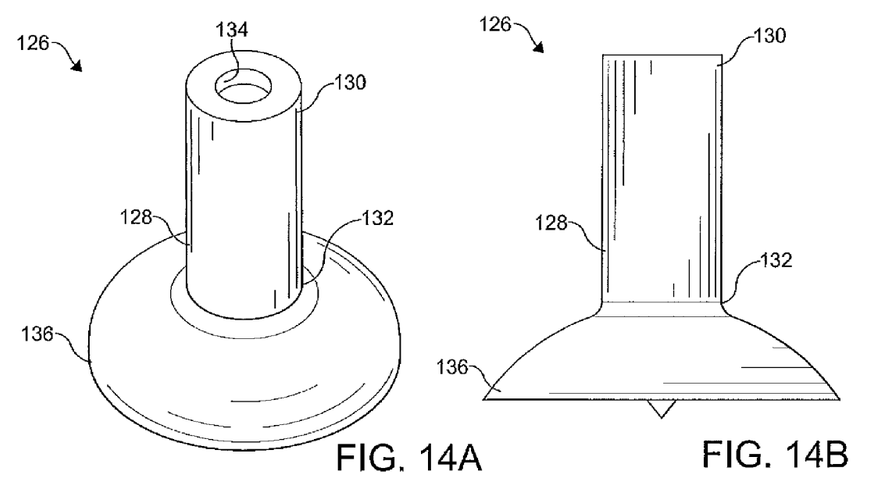
FIG. 14A is a perspective view of a valve having a valve disk adapted to be slidably received within the cage between the splash guard and the cage end cap.
FIG. 14B is a front elevational view of the valve of FIG. 14A.

A valve 126, illustrated in FIGS. 14A-14B, is provided having a valve stem 128 including an upper end 130 and a lower end 132. A central opening 134 is formed in the upper end 130 of the valve stem 128. A radially outwardly extending valve disk 136 is formed at the lower end 132 of the valve stem 128. As a non-limiting example, the valve disk 136 has a generally semi-spherical shape. However, the valve disk 136 can have any size and shape. The valve 126 is reciprocatingly disposed within the fluid chamber 117, wherein the valve stem 128 extends through the first valve opening 84 formed in the floor panel 68 of the cage 60 and the second valve opening 104 formed in the splash guard 94. The valve disk 136 is adapted to abut the lower surface 72 of the floor panel 68 of the cage 60 to form a substantially fluid tight seal therebetween surrounding the first valve opening 84 when the valve 126 is in a closed position. Further, the valve disk 136 is adapted to be received in the valve seat 118 formed in the upper surface 108 of the cage end cap 106 when the valve 126 is in a fully open position.

Figure 15:
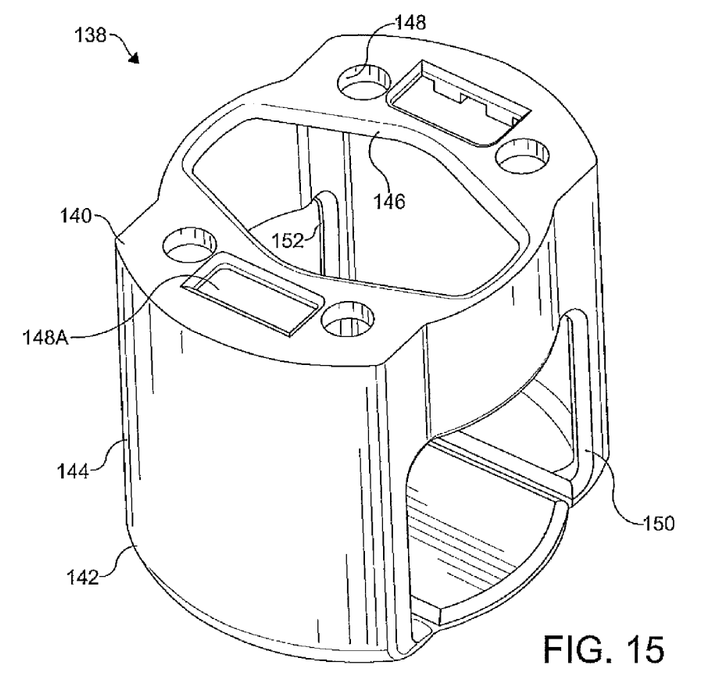
FIG. 15 is a perspective view of a float guard of the vent cap illustrated in FIG. 1.

As shown in FIG. 15, the hollow float guard 138 includes an upper end 140, a lower end 142, and a sidewall 144 extending therebetween. A float opening 146 is formed in the upper end 140. A plurality of openings 148 is also formed in the upper end 140 of the float guard 138. The openings 148 are adapted to receive the coupling members 124 depending from the lower surface 110 of the cage end cap 106 to facilitate coupling the float guard 138 to the cage end cap 106. As a non-limiting example, a pair of snap-fit apertures 148A are formed in the upper end 140 of the float guard 138 and are adapted to receive the snap coupling members 124A. In the illustrated embodiment, two members are coupled together to form the float guard 138. It should be understood that the two members can be coupled together employing an adhesive, a snap-fit, sonic welding, and the like, for example. The float guard 138 can also be produced from a single member. Fluid openings 150, 152 are formed in opposing sides of the sidewall 144 adjacent the lower end 132 of the float guard 138. The fluid openings 150, 152 are adapted to provide a fluid flow path into the hollow interior of the float guard 138. As shown, the fluid openings 150, 152 are oriented to be about ninety degrees offset from the slots 76, 78 formed in the sidewall 62 of the cage 60, although other orientations can be used.

Figure 16:
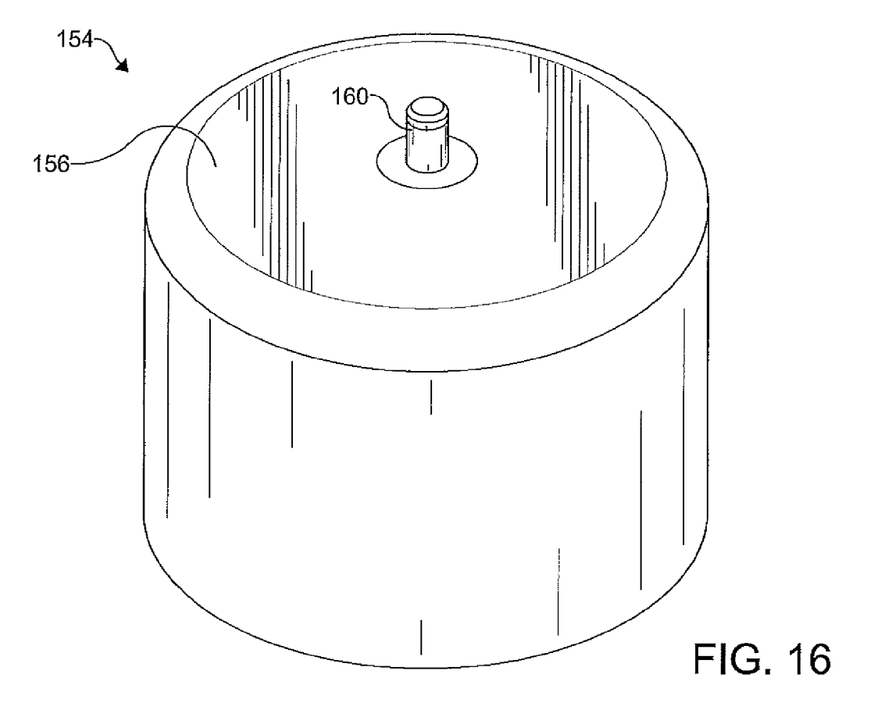
FIG. 16 is a perspective view of a float adapted to be movably received within the float guard of FIG. 15.
Figure 17:
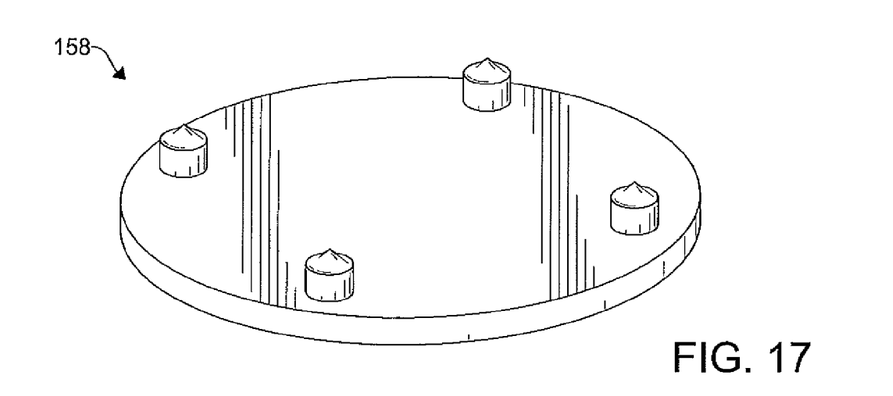
FIG. 17 is a perspective view of an end cap for the float illustrated in FIG. 16.

A float 154, shown in FIG. 16, is disposed within the hollow interior of the float guard 138. The float 154 is adapted to float on a surface of a fluid received in the hollow interior of the float guard 138. In the illustrated embodiment, the float 154 is a hollow, generally cylindrically shaped float having a main body 156 including an open end. A float end cap 158, shown in FIG. 17, is coupled to and covers the open end. A protuberance 160 is formed on an upper surface of the main body 156. It should be understood that the float 154 can have other shapes such as a trapezoidal prism shape or a frusto-conical shape, and can have an open end.

Figure 18:
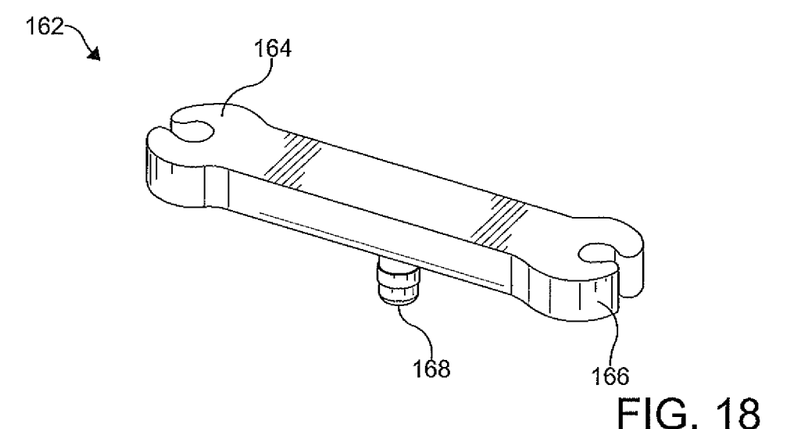
FIG. 18 is a perspective view of a yoke adapted to be coupled to the valve of the vent cap illustrated in FIG. 1.

An elongate yoke 162, as illustrated in FIG. 18, is provided. The yoke 162 includes coupling members 164, 166 formed on opposing ends thereof. A protuberance 168 is formed on the yoke 162 intermediate the coupling members 164, 166 and adapted to be received in the opening 134 formed in the upper end 130 of the valve stem 128 to couple the yoke 162 to the valve 126.

Figure 19:
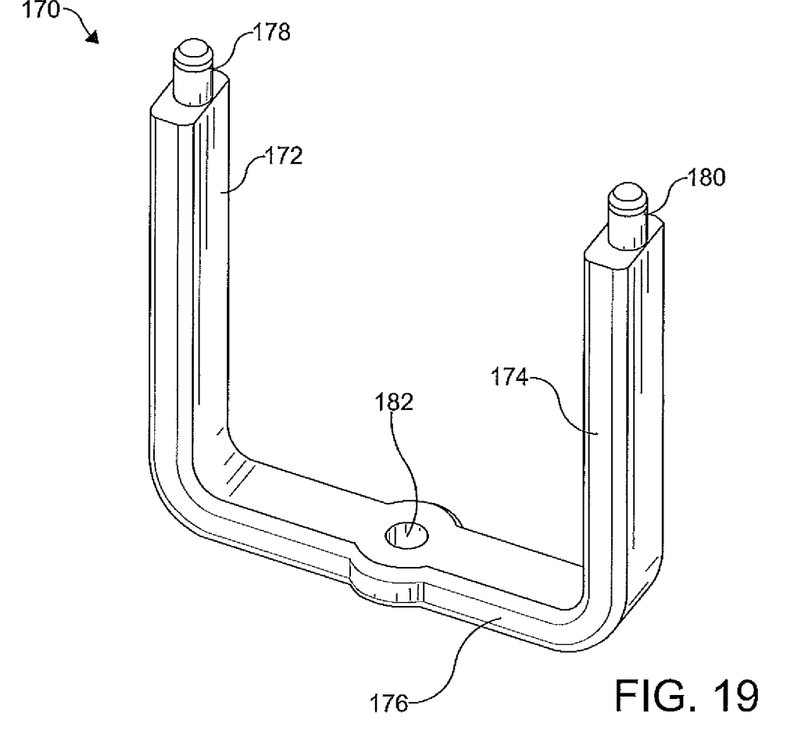
FIG. 19 is a perspective view of a fork adapted to be coupled to the yoke and the float of the vent cap illustrated in FIG. 1 to cause an opening and a closing of the valve of the vent cap.

As shown in FIG. 19, a generally U-shaped fork member 170 is provided including arm members 172, 174 and a cross-member 176 extending between respective first ends thereof. Second ends of the arm members 172, 174 include substantially cylindrical protuberances 178, 180 extending axially outwardly therefrom. The cross-member 176 includes an opening 182 formed therein. The cross-member 176 is disposed in the hollow interior of the float guard 138. The arm members 172, 174 extend upwardly from the hollow interior of the float guard 138 through the respective rectangular openings 120, 122 formed in the cage end cap 106 and the respective rectangular openings 88, 90 formed in the floor panel 68 of the cage 60, placing the cylindrical protuberances 178, 180 within the cage 60. The cylindrical protuberances 178, 180 of the fork member 170 are received by the coupling members 164, 166 of the yoke 162 to couple the fork member 170 to the yoke 162. The protuberance 160 formed on the upper surface of the float 154 is received within the opening 182 formed in the cross-member 176 of the fork member 170. The float 154 cooperates with the fork member 170 and the yoke 162, wherein a movement of the float 154 causes a movement of the valve 126.

It should be understood that the components of the vent cap 10 can be formed from a plastic material employing an injection molding process or other materials and processes as desired. The components can be coupled together employing an adhesive, a snap-fit, sonic welding, and the like, for example.

Figure 20:
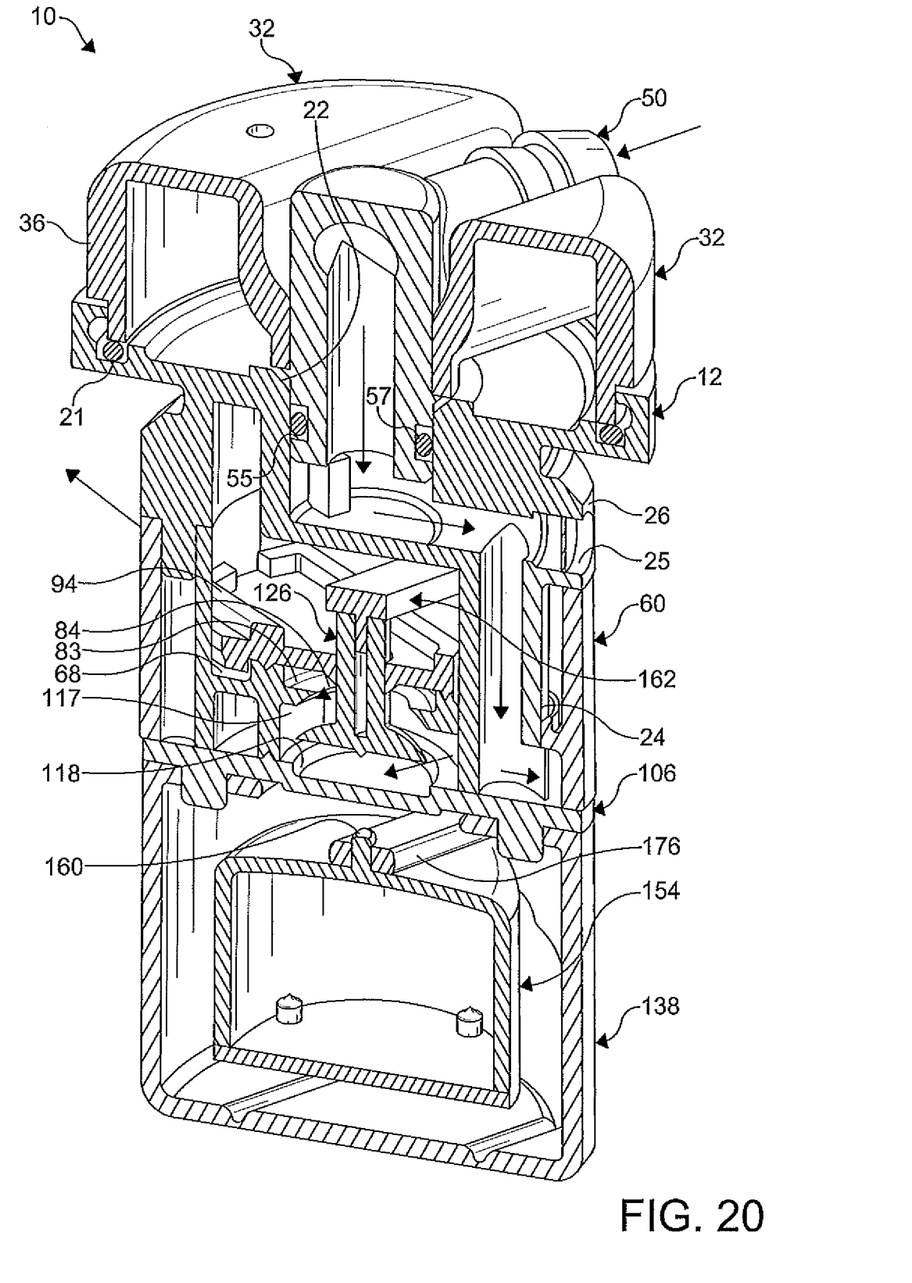
FIG. 20 is a cross-sectional perspective view of the vent cap illustrated in FIG. 1 showing a fluid flow path through the vent cap.

In operation, the vent cap 10 is installed within an opening formed in the battery cover 11A for the battery cell 11. The vent cap 10 includes a flow path formed therethrough which allows a fluid such as water, for example, to be added to the battery cell 11 without removing the vent cap 10 from the opening formed in the battery cover 11A for the battery cell 11, the flow path illustrated in FIG. 20.

A tube (not shown) is attached at one end to a source of a fluid (not shown) and at an opposing end to one of the lateral ends 54, 56 of the T-fitting 50 of the vent cap 10. The tube provides a fluid flow path from the source of fluid to the flow path through the vent cap 10. A first end of a second tube can be attached to the other lateral end 54, 56 of the T-fitting 50. An opposing end of the second tube can be connected to a lateral end of a T-fitting of a second vent cap (not shown). A plurality of vent caps 10 can be serially connected in like manner, wherein the fluid can be added substantially simultaneously to a plurality of associated battery cells from the source of the fluid.

The fluid from the source flows through the tube into the T-fitting 50. At least a portion of the fluid can flow through the base end 52 of the T-fitting 50 into the first cavity 22 formed in the base member 12. Fluid flows from the first cavity 22 through the passageway 25 and the fluid conduit 24 into the fluid chamber 117. When the valve 126 is in an open position, fluid can flow through the first valve opening 84 into the flow channel 83 and out of the vent cap 10 into the associated battery cell 11 through the slots 76, 78 formed in the sidewall 62 of the cage 60.

The valve 126 is adapted to selectively open and close the first valve opening 84 to selectively permit fluid to be received in the associated battery cell 11. In the closed position, the valve disk 136 of the valve 126 abuts the lower surface 72 of the floor panel 68 of the cage 60 to form a substantially fluid tight seal around the first valve opening 84. The float 154 is adapted to float adjacent the upper surface of the fluid within the battery cell 11. As the fluid level within the battery cell 11 falls, the float 154 moves downward in respect of the vent cap 10. The float 154 is connected to the valve 126 by the fork member 170 and the yoke 162. As the float 154 moves downward, the valve 126 also moves downward causing the valve disk 136 to move away from the lower surface 72 of the floor panel 68 to the open position, wherein fluid is permitted to flow through the first valve opening 84. When the fluid within the battery cell 11 falls below a selected minimum fluid level, the valve 126 is in the fully open position, wherein the valve disk 136 is received in the valve seat 118 which allows fluid to flow from a peripheral edge of the fluid chamber 117 over the valve disk 136 and through the first valve opening 84. The flow of fluid over the valve disk 136 when the valve disk 136 is received in the valve seat 118 militates against an undesired closing of the valve 126.

As the water level rises to and/or above the selected minimum fluid level in the battery cell 11, the float 154 causes the valve disk 136 to move upwardly in respect of the valve seat 118. When the valve disk 136 moves upwardly, fluid flowing through the fluid chamber 117 impinges upon the valve disk 136 and facilitates forcing the valve 126 to the closed position which militates against an overfilling of the battery cell 11 and facilitates maintaining a selected fluid level within the battery cell 11. Connecting a plurality of the vent caps 10 in series allows fluid to be added substantially simultaneously to those associated battery cells having a fluid level below the selected minimum fluid level.

The flow path through the vent cap 10 is adapted to retain the fluid therein when the vent cap 10 is not in fluid communication with the source of fluid. The fluid substantially prevents gases from escaping to the surrounding atmosphere and/or to other battery cells through the flow path and the associated tubes connected to the T-fitting 50. Gases are discharged from the battery cell 11 through the slots 76, 78 formed in the sidewall 62 of the cage 60 into the interior of the cage 60. The gases flow upwardly in respect of the vent cap 10 between the attachment member 26 and the first cavity 22 on the lower surface 16 of the base member 12 and through the apertures 28 into the interior of the condenser housing 32. Gases received in the interior of the condenser housing 32 flow around a fluid condensing medium disposed therein adapted to condense an electrolyte thereon. The gases then pass through the flame arrester and apertures 48 formed in the top panel 34 of the condenser housing 32 into the surrounding atmosphere. The condensed liquid electrolyte flows back through the apertures 28 and the cage 60 and is reintroduced into the battery cell 11 through the slots 76, 78 formed in the sidewall 62 of the cage 60.

Discharging fluid from the vent cap 10 through the slots 76, 78 formed in the sidewall 62 of the cage 60 at about ninety degrees from the fluid openings 150, 152 in the float guard 138 substantially prevents incoming fluid from impinging the float 154. By substantially preventing the incoming fluid from impinging the float 154, mineral and other deposits collecting on the float 154 can be minimized which militates against a malfunction of the float 154. Further, substantially preventing the incoming fluid from impinging the float 154 militates against an undesired sinking of the float 154 which would result in overfilling of the battery cell 11 by maintaining the valve 126 in an open position.

Rotatably coupling the condenser housing 32 to the base member 12 allows a 360-degree rotation of the condenser housing 32 in respect of the base member 12 which facilitates interconnecting a plurality of the vent caps 10 and connecting the vent cap 10 to the source of fluid. Additionally, placing the opposing lateral ends 54, 56 of the T-fitting 50 within the U-shaped channel 40 minimizes an overall height of the vent cap 10 and protects the T-fitting 50 and the associated tubes from contacting other objects which could cause damage to the T-fitting 50 and the associated tubes.

Additionally, employing the flow of fluid through the fluid chamber 117 to facilitate moving the valve 126 to the closed position facilitates forming the substantially fluid tight seal between the valve disk 136 and the lower surface 72 of the floor panel 68 of the cage without the aid of a sealing member such as an O-ring or a valve washer, for example.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A vent cap comprising:
a main body configured to be received within an opening in a cover of a battery cell, the main body including a fluid flow path formed therethrough to facilitate a flow of a fluid to be added to the battery cell, wherein the main body includes a slot formed in a first exterior side wall thereof, the slot defining an outlet of the fluid flow path, whereby the fluid to be added to the battery cell flows horizontally through the slot and into the battery cell;
a valve moveably disposed within the fluid flow path to selectively open and close the fluid flow path, the valve including a valve stem and a valve disk extending radially outwardly from the valve stem, wherein the valve disk is configured to be seated within a recessed valve seat when the valve is in a fully open position; and
a float coupled to the valve and positioned to float adjacent a surface of the fluid within the battery cell, the float causing the valve to open the fluid flow path when a fluid level within the battery cell is lowered to permit the fluid to be added to the battery cell to flow through the fluid flow path, wherein the fluid flow path is configured to minimize an impinging on the float by the fluid to be added to the battery cell.

2. The vent cap according to claim 1, further comprising a hollow float guard disposed around the float to enclose at least a portion of the float.

3. The vent cap according to claim 2, wherein the float guard includes openings foamed therein to allow the fluid to pass therethrough.

4. The vent cap according to claim 1, wherein a position of the valve disk controls the flow of the fluid passing through the fluid flow path.

5. The vent cap according to claim 1, further comprising a splash guard disposed adjacent the valve and defining at least a portion of the fluid flow path, wherein the splash guard includes an aperture to receive the valve stem therethrough.

6. The vent cap according to claim 1, further comprising a cage defining the first exterior side wall and a second exterior side wall of the main body, the cage including a floor panel coupled to and extending between the first and second exterior side walls of the main body, the floor panel including a valve opening to receive the valve stem therethrough, wherein the valve disk sealingly abuts the floor panel when in a fully closed position.

7. A vent cap comprising:
a main body received within an opening in a cover of a battery cell, the main body including a fluid flow path formed therethrough to facilitate a flow of a fluid to be added to the battery cell, wherein the main body includes a slot formed in a first exterior side wall thereof, the slot defining an outlet of the fluid flow path, whereby the fluid to be added to the battery cell flows horizontally through the slot and into the battery cell;
a valve having a valve stem and a valve disk extending radially outwardly from the valve stem, the valve disk disposed within the fluid flow path to selectively open and close the fluid flow path, wherein the valve disk is configured to be seated within a recessed valve seat when the valve is in a fully open position; and
a float coupled to the valve stem and positioned to float adjacent a surface of the fluid disposed within the battery cell, the float causing the valve to open the fluid flow path when a fluid level within the battery cell is lowered to permit the fluid to be added to the battery cell to flow through the fluid flow path, wherein the fluid flow path is isolated from the float to minimize an impinging on the float by the fluid to be added to the battery cell.

8. The vent cap according to claim 7, further comprising a hollow float guard disposed around the float to enclose at least a portion of the float.

9. The vent cap according to claim 8, wherein the float guard includes openings formed therein to allow the fluid to pass therethrough.

10. The vent cap according to claim 7, further comprising a splash guard disposed adjacent the valve and defining at least a portion of the fluid flow path, wherein the splash guard includes an aperture to receive the valve stem therethrough.

11. The vent cap according to claim 7, further comprising a cage defining the first exterior side wall and a second exterior side wall of the main body, the cage including a floor panel coupled to and extending between the first and second exterior side walls of the main body, the floor panel including a valve opening to receive the valve stem therethrough, wherein the valve disk sealingly abuts the floor panel when in a fully closed position.

12. The vent cap according to claim 7, further comprising a yoke coupled to the valve stem and extending radially outwardly to couple the valve stem to the float.

13. The vent cap according to claim 7, further comprising a "U" shaped fork disposed between and coupled to the float and a yoke wherein a movement of the float translates to a reciprocal movement of the valve stem and valve disk to selectively open and close the fluid flow path.

14. A method of filling a battery cell with a fluid, the method comprising the steps of:
providing a vent cap including: a main body having a fluid flow path formed therethrough; a valve moveably disposed within the fluid flow path to selectively open and close the fluid flow path; and a float coupled to the valve and positioned to float adjacent a surface of the fluid disposed within the battery cell, the float configured to move along an axis causing the valve to open the fluid flow path when a level of the fluid disposed within the battery cell is lowered;
directing the fluid through the fluid flow path and into the battery cell, wherein the fluid flow path is configured to minimize an impinging on the float by the fluid directed through the fluid flow path, and wherein the fluid is discharged from the vent cap through an outlet of the fluid flow path formed in an exterior side wall of the main body, the outlet of the fluid flow path extending through the main body along an axis which intersects the axis along which the float moves to cause the valve to open; and
elevating the fluid level within the battery cell to cause the float to move, thereby causing the valve to close the fluid flow path.

15. The method according to claim 14, wherein the valve includes a valve stem and a valve disk extending radially outwardly from the valve stem, and wherein a position of the valve disk controls a flow of the fluid passing through the fluid flow path.

16. The method according to claim 14, wherein the main body includes a slot formed in the exterior side wall thereof, the slot defining the outlet of the fluid flow path, whereby the fluid to be added to the battery cell flows through the slot and into the battery cell.

17. The method according to claim 14, wherein the outlet of the fluid flow path extends through the main body substantially parallel to a plane generally defined by the surface of the fluid disposed within the battery cell.

\* \* \* \* \*